United States Patent [19]

Fisher et al.

[11] Patent Number: 4,940,535

[45] Date of Patent: Jul. 10, 1990

[54] SOLIDS FLOW DISTRIBUTION APPARATUS

[75] Inventors: William F. Fisher, Horning Norwich, England; Grant A. Young, Tulsa, Okla.

[73] Assignee: Amoco Corporation, Chicago, Ill.

[21] Appl. No.: 276,971

[22] Filed: Nov. 28, 1988

[51] Int. Cl.$^5$ .................. B07B 1/28; B65G 53/40
[52] U.S. Cl. .................. 209/250; 137/875; 137/883; 175/206; 210/340; 406/155
[58] Field of Search .............. 209/243, 247, 250, 254, 209/268, 269; 137/561 A, 883, 886, 875; 210/330, 340; 175/206; 406/154–156, 180, 181, 183

[56] References Cited

U.S. PATENT DOCUMENTS

| | | | |
|---|---|---|---|
| 2,716,493 | 8/1955 | Hutchison | 209/269 X |
| 2,750,043 | 6/1956 | Thompson | 210/340 |
| 3,306,671 | 2/1967 | Leeman | 209/243 UX |
| 3,988,243 | 10/1976 | Huff | 209/269 X |
| 4,175,591 | 11/1979 | Welker | 137/883 |
| 4,376,042 | 3/1983 | Brown | 209/2 X |

Primary Examiner—Johnny D. Cherry
Assistant Examiner—Edward M. Wacyra
Attorney, Agent, or Firm—Scott H. Brown; Fred E. Hook

[57] ABSTRACT

A solids flow distribution apparatus is disclosed for use with two or more solid separation devices, such as shale shakers. The appartatus includes a plenum in communication with a source of flow of solids and liquid, such as from a drilling rig's mud system. The plenum includes lower outlets positioned adjacent inlet zones for each solid separation device. Valves are positioned across the lower outlets for regulating the quantity of solids and liquids that flow into the inlet zones of each solid separation device. A variable distribution apparatus is included within the plenum adjacent the flow inlet for regulating the proportion of solids directed towards each solid separation device.

9 Claims, 4 Drawing Sheets

SOLIDS FLOW DISTRIBUTION APPARATUS

BACKGROUND OF THE INVENTION

1. Field of the Invention

The present invention relates to solids separation devices and, more particularly, to an apparatus which distributes the flow of solids to two or more solid separation devices.

2. Setting of the Invention

In the technology of separating entrained solids from liquids, it is well known to use solid separation devices such as desilters, desanders, hydrocyclones, centrifuges and especially shale shakers. Generally, shale shakers are devices that operate by passing a mixture of solids and liquid onto a vibrating screen. The motion of the vibrating screen causes fine solids and liquid to pass through the screens and passed on downstream for further processing, if desired. The solids that cannot pass through the screen are transported there across to a discard zone. In the event that two or more solid separation devices are utilized in parallel, the usual arrangement for the distribution of the inlet flow of solids and liquid to such solids control devices is as shown in FIG. 1. As can be seen in FIG. 1, a simple Y, T, or elbow connection is made from a main conduit to direct the flow of solids and liquid to inlet zones of the shale shakers. This arrangement has a major problem in that the proportion of solids provided to each of the shale shakers is not regulated, so that one shale shaker may be overburdened so that the separation efficiency decreases as the screens become clogged. Even using valves on each inlet flow conduit does not regulate the quantity and proportion of the solids that are passed to each shale shaker.

There is a need for a reliable mechanism for regulating the proportion of solids that is provided to each solid separation device.

In prior shale shakers, the flow of solids and liquid passes first into an accumulation zone, usually called a "mud box" and shown in FIG. 1A. This mud box serves as a location for electronic sensing equipment to be positioned, such as a mud gas detector and other mud sensor instrumentation. The larger solids tend to lose their mobility in this accumulation zone and begin to fill the mud box. When the shale shaker's screens are changed, a dump valve located near the bottom of the mud box is opened and these larger solids, as well as the total flow of solids and liquid are passed downstream where they become remixed with "clean" fluid. It is well known that such larger solids clog downstream solid separation equipment, especially hydrocyclones. Further, the accumulation of larger solids in the mud box must be removed periodically. Usually, a lower trap door is opened or an operator must shovel the solids out. In either case, a considerable loss of expensive drilling fluids occurs.

There is a need for a solids separation device which can eliminate the need for a solids accumulation zone, or at least prevent separated larger cuttings from reentering the solids separation flow.

SUMMARY OF THE INVENTION

The present invention has been designed to overcome the foregoing deficiencies and meet the above-described needs. Specifically, the present invention is a solids flow distribution apparatus for use with two or more solid separation devices, such as shale shakers, desilters, desanders, hydrocyclones, and centrifuges. The apparatus comprises a plenum, such as a horizontally disposed elongated chamber, that is positioned above inlet zones of the solid separation devices. The plenum includes an inlet for communication with a source of the flow of solids and liquid, such as from a drilling well, and also includes lower outlets positioned adjacent the solids separation device's inlet zones. Valves are positioned across these lower outlets for regulating the quantity of solids and liquid that flow to each solid separation device. A variable distribution device, such as a movable or tiltable plate, is connected within the plenum adjacent the solids and liquid inlet for regulating the proportion of solids directed to each solid separation device.

To prevent the problem of larger solids accumulating within the accumulation zone of a solids separation device, an angled plate or chute is connected beneath each lower outlet of the plenum to direct the flow of solids and liquid across the accumulation zone and directly to the separation zones of each solids separation device. The mud logging instrumentation is relocated to a secondary fluid accumulation zone within the plenum.

BRIEF DESCRIPTION OF THE DRAWINGS

FIG. 1a is a partial left side elevational cut away view of an accumulation zone of a Prior Art shale shaker, like that shown in FIG. 1.

FIG. 2a is a partial left side elevational cut-away view of an inner portion of the solids flow distribution apparatus of FIG. 2.

DETAILED DESCRIPTION OF THE PREFERRED EMBODIMENTS

Generally, the present invention is a solids flow distribution apparatus for use with two or more solid separation devices, such as shale shakers, centrifuges, hydrocyclones, desilters, desanders and the like. Within the present invention, a plenum includes an inlet for communication with a source of solids and liquid and also includes lower outlets positioned adjacent inlet zones for each solid separation device. Valves are positioned across the lower outlets for regulating the quantity of solids and liquids that flow into the inlet zones of each of the solid separation devices. A variable distribution mechanism is provided within the plenum adjacent the inlet for regulating the proportion of solids directed to each solid separation device. For the purposes of the present discussion the invention will be described in use with shale shakers that are separating drill solids removed from a wellbore during drilling, however, any other field of operation that uses solids separation devices can benefit from the use of the present invention, such as mining, textile manufacturing, waste clean up, and the like.

Figure 1:
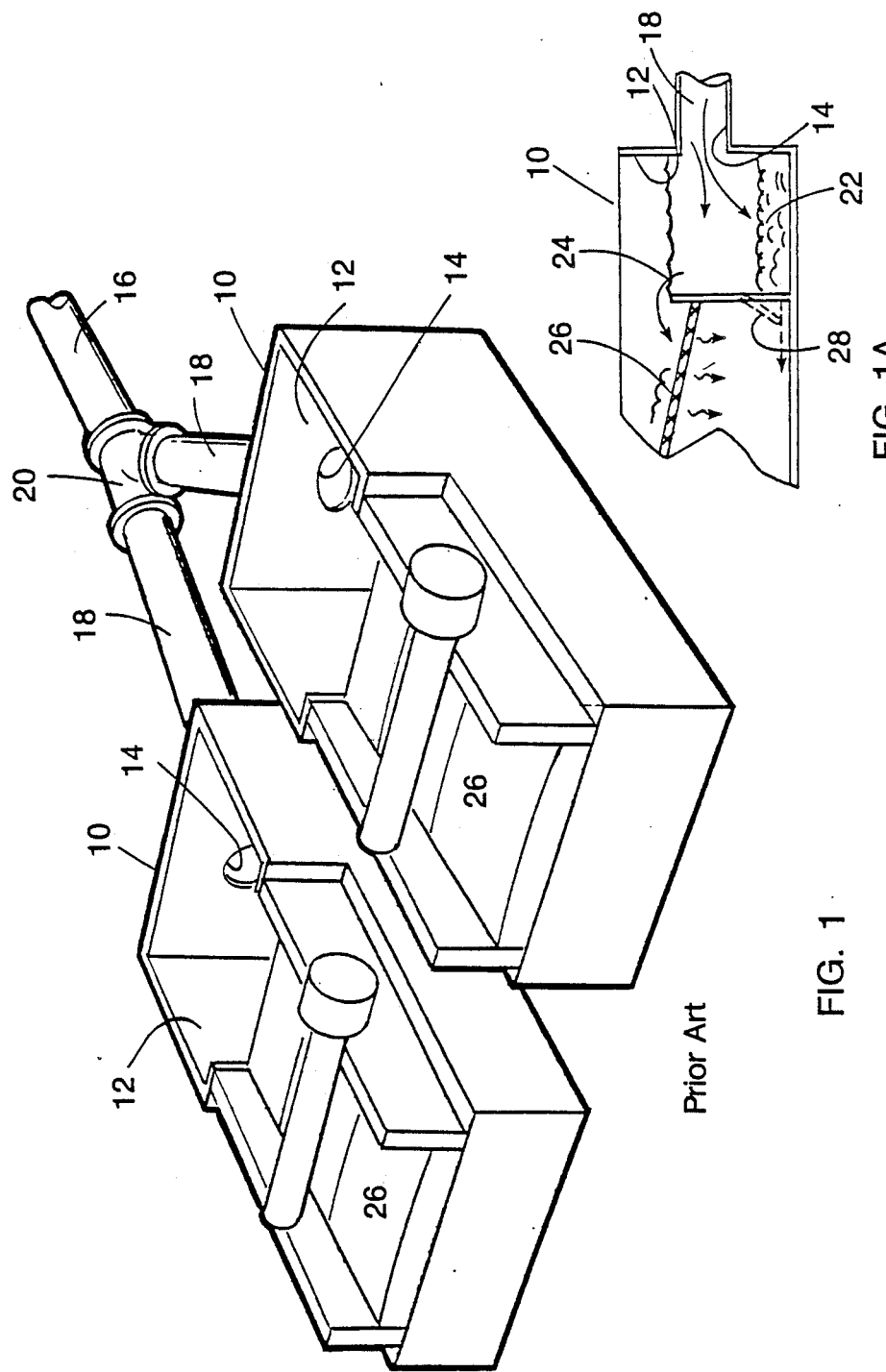
FIG. 1 is a front perspective view of a Prior Art arrangement of flow distribution to two or more solids controls devices.

As shown in FIGS. 1 and 1a, one or more solid separation devices, such as shale shakers 10 each have accumulation zones 12 (referred to as mud boxes) fed through lower openings 14 in communication to a source of flow of solids and liquid via a main flow conduit 16. One or more secondary flow conduits 18 branch off from the conduit 16 via pipe connection 20, such as a Y, T, or other similar arrangement with or without valves (not shown) to direct the flow to each shale shaker 10. As described previously, this arrangement has been found wanting because it is impossible or impractical to regulate the proportion and quantity of solids that are directed to each shale shaker 10. Further, as shown in FIG. 1a, within each shale shaker's 10 accumulation zone 12, larger solids 22 accumulate in a lower portion thereof as smaller solids and fluid flow upwardly over a weir 24 onto a vibrating screen 26. If the screen 26 is to be bypassed, a lower vertically operated plate valve or hinged trap door 28 is opened thereby permitting the flow of solids and liquid, as well as the larger solids 22 to pass under the screen 26 downstream to other solid separation devices (not shown), which is not desired.

Figure 2:
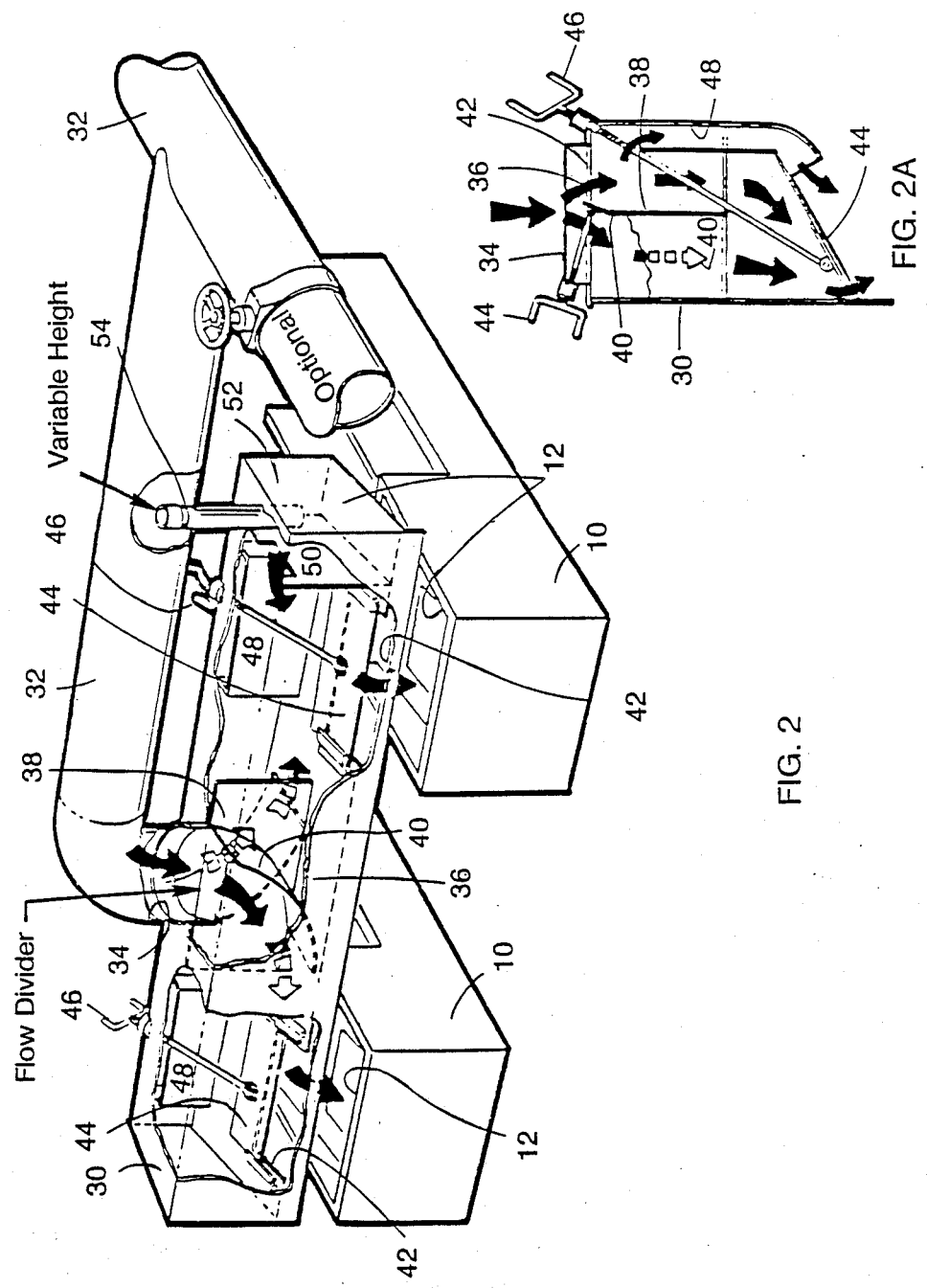
FIG. 2 is a front perspective view of a solids flow distribution apparatus embodying the present invention providing a flow of solids and liquid to two or more shale shakers.

In the present invention, a manifold or plenum 30, generally comprised of an elongated, horizontally-disposed chamber or box having a curved or angled bottom, is positioned above the inlet zones of the shale shakers 10. A flow of solids and liquid, such as from a drilling rig's mud system, is provided via a main conduit 32 into an inlet 34 of the plenum 30. As shown in FIGS. 2 and 2a, the inlet 34 is located within an upper portion of the plenum 30 and immediately adjacent thereto is a variable solids distribution mechanism 36. The variable solids distribution mechanism 36 generally comprises a vertical plate 38 connected on a lower edge to the bottom of the plenum 30 inline or longitudinally disposed. On either side of the plate 38 are curved chutes or angled plates 40 which direct the flow of solids towards each of the two shale shakers 10. The plate 38 can have a hinge on a lower edge thereof so that the plate 38 can be tilted or angled laterally from side-to-side to adjust the proportion of solids passing down each chute 40, Alternatively, as shown in FIG. 2a, the lower edge of the plate 38 is fixed, and an upper edge of the plate 38 includes a hinge 41 and a tiltable upper plate extension 42. In either case, the portion of the plate 38 or extension 42 that tilts is moved/adjusted by action of screw crank 46 to vary the quantity of flow of solids and liquid that flow down the chutes 40 to each shale shaker 10.

Once the flow of solids and fluid have passed down the chutes 40 within the plenum 30, the flow then passes through lower openings 42 in the plenum 30 to the shale shakers 10. The quantity of the flow of solids and liquid passing to each shale shaker 10 through the openings 42 is regulated by valves 44, such as sliding plate valves controlled by screw cranks 46.

The position of the valves 44 and the flow distribution plate 38 or extension 42 can be controlled manually, as shown in FIGS. 2 and 2a by operation of the screw cranks 46, or by operation of locally (at the unit) or remotely controlled electric, hydraulic or pneumatic devices, as is well known to those skilled in the art. Also, sensors (not shown) can be included within each shale shaker 10 and other upstream and/or downstream solids control devices to measure the quantity of solids within the liquid and/or the wetness/dryness of the separated solids. These sensors can send analog or digital signals to a programmable digital computer. Algorithms within the computer can then calculate the optimum position of the plates 38/42 and valves 44, and can cause solenoids, motors and the like to automatically adjust the position of the plates 38/42 and valves 44.

In the event that the quantity of solids and liquids passing into the plenum 30 exceeds that which is capable of being passed through the lower outlets 42, one or more chambers with inlet weirs 48 are provided within an upper portion of the plenum 30. If fluid within plenum 30 rises and passes over the weir 48, it will be passed downwardly directly to the shale shakers 10 there below.

If an accumulation zone 12 of the shale shakers 10 is to by bypassed, a secondary fluid accumulation zone 50 can be provided within the plenum 30 by locating a weired baffle at one end thereof so that the necessary or desired mud logging sensors and instrumentation can be located therein. Also, fluid can pass from the conduit 32 via a variable height telescopic bypass pipe 54 into the secondary fluid accumulation zone 52.

Figure 3:
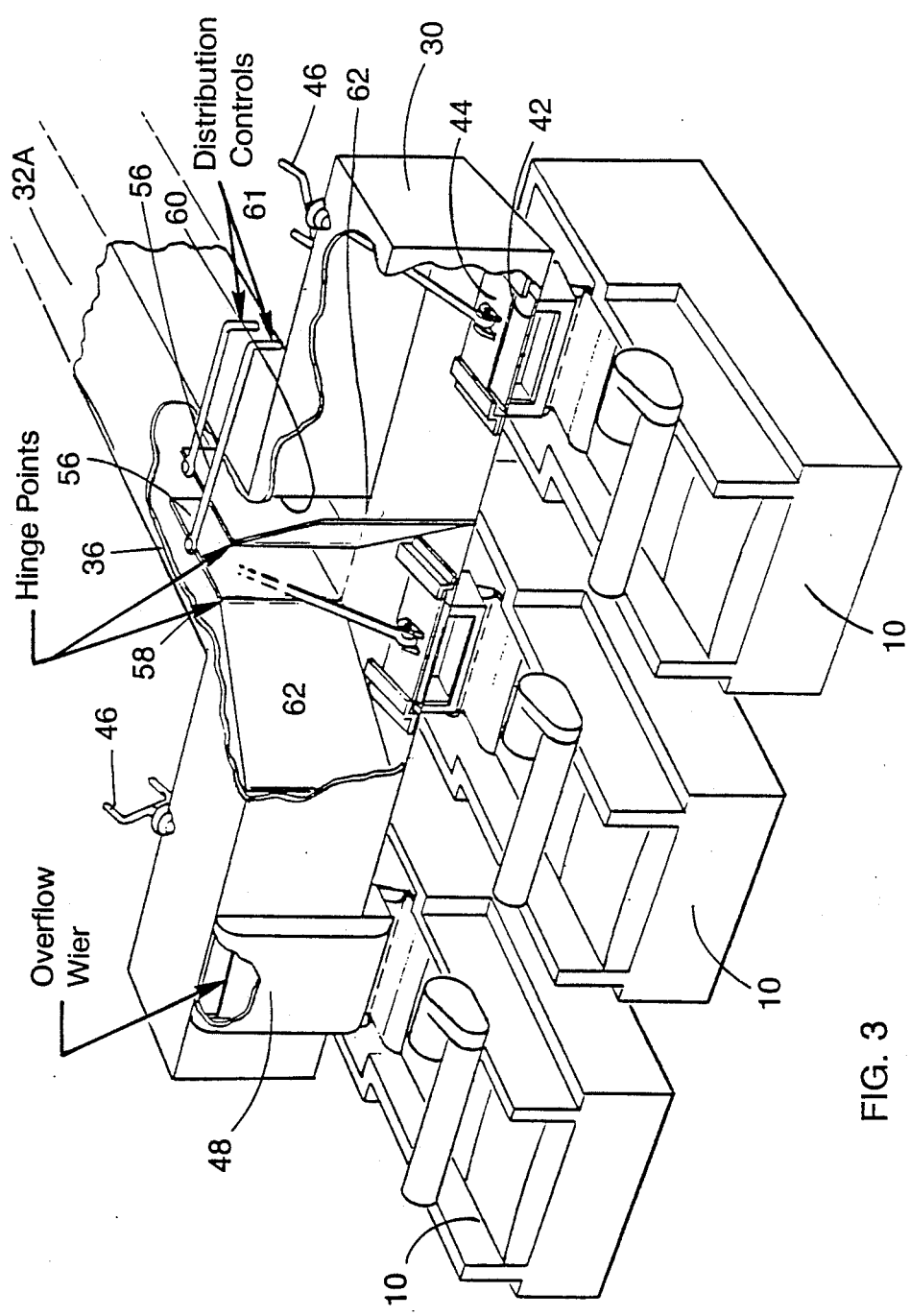
FIG. 3 is a front perspective view of an alternate embodiment of a solids flow distribution apparatus of the present invention.
Figure 4:
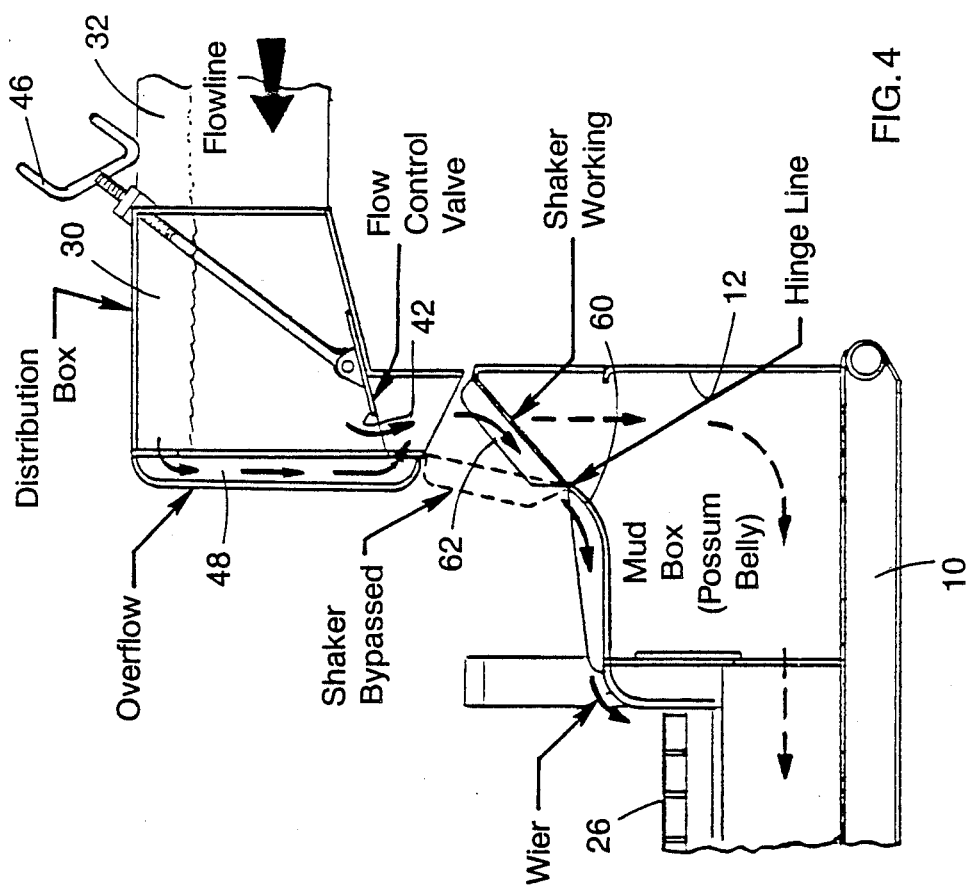
FIG. 4 is a partial left side elevational cutaway view of an alternate embodiment of a solids flow distribution apparatus embodying the present invention.

FIG. 3 shows an alternate embodiment of the present invention wherein instead of two shale shakers 10, the flow of solids to three or more shale shakers 10 is regulated by vertical plates 56 connected via hinges 58 within a horizontal flow inlet 59 connected to the conduit 32A. There are sufficient plates 56 to divide the flow of solids to each of the required number of shale shakers 10. Each plate 56 is independently azimuthally adjusted by handles 61, which in turn can be adjusted as described previously in relation to screw cranks 46. Internal, usually nonmovable plates 62 or chutes are connected within the plenum 30 and assist in distributing the flow of fluids and solids from the conduit 32A, past the variable positioned plates 56 to each of the lower openings 42.

If nonmodified shale shakers 10 are used, it is preferred that the flow of solids and liquid pass from the plenum 30 directly onto the operative portion of the shale shakers 10 thus bypassing the solids accumulation zone (mud box) 12, for the reasons described previously. To accomplish this, an angled plate or chute 60 can be removably or permanently connected across an upper portion of the accumulation zone 12 or it can be removably or permanently connected to a lower portion of the plenum 30. In the event that a particular shale shaker 10 is to be bypassed then the opening 42 above that shale shaker 10 can be closed by closing said valve 44, thus preventing the flow of solids passing to the downstream solids separation equipment. Also, a trap door 63 can be provided in the plate or chute 60 so that the flow of solids and liquid can bypass a particular shale shaker 10. The bypassed flow through the door 63 can be passed to other shale shakers 10, to a holding tank or pit, or, if necessary but not desired, into the solids accumulation zone 12 of the shale shaker 10.

Wherein the present invention has been described in particular relation to the drawings attached hereto, it should be understood that other and further modifications, apart from those shown or suggested herein, may be made within the scope and spirit of the present invention.

What is claimed is:

1. A feeder device for a plurality of solids separation devices, comprising:
 a plenum disposed adjacent the solid separation devices, and including a flow inlet in communication with a source of flow of solids and liquid, and including lower outlets positioned adjacent inlet zones of each solid separation device;

sliding plate valve means for regulating the quantity of solids and liquids that flow from the lower outlets into the inlet zones of each solid separation device; and variable distribution means connected within the plenum adjacent the flow inlet for regulating the proportion of solids directed towards each solids separation device.

2. A feeder device of claim 1 wherein the plenum is positioned above the solid separation devices.

3. A feeder device of claim 1 wherein the plenum is a horizontal, elongated chamber having an inclined lower panel.

4. A feeder device of claim 1 wherein the variable distribution means comprises a vertically disposed tiltable plate.

5. A feeder device of claim 1 wherein the variable distribution means comprises a vertically disposed azimuthally adjustable plate.

6. A feeder device of claim 1 and including a fluid overflow weir within the plenum to bypass fluids from within the plenum directly to the solid separation devices.

7. A feeder device of claim 1 and including a lateral weired baffle within the plenum defining a secondary fluids accumulation zone for location of mud logging sensors and instrumentation.

8. A feeder device of claim 1 and including plate means connected beneath the plenum for passing solids and liquids directly to a separation zone within the solid separation devices and bypassing a solids accumulation zone within the solid separation devices.

9. A feeder device of claim 8 wherein the plate means includes a bypass door.

* * * * *